(12) United States Patent
Neubauer et al.

(10) Patent No.: US 6,269,095 B1
(45) Date of Patent: Jul. 31, 2001

(54) B-CHANNEL SYNCHRONIZATION FOR G 723 1 VOCODING

(75) Inventors: Harald Neubauer, Taufkirchen (DE); Mark Skrzynski, Capitola; Gregory Dumas, Milpitas, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/019,372

(22) Filed: Feb. 4, 1998

(51) Int. Cl.[7] .................................................. H04J 3/06
(52) U.S. Cl. ............................................. 370/352; 370/503
(58) Field of Search .................................. 370/352–356, 370/503, 537

(56) References Cited

U.S. PATENT DOCUMENTS

| | | |
|---|---|---|
| 4,903,261 | 2/1990 | Baran et al. . |
| 5,442,630 | 8/1995 | Gagliardi et al. ................ 370/85.13 |
| 5,479,407 | 12/1995 | Ko et al. ............................ 370/94.1 |
| 5,526,353 | 6/1996 | Henley . |
| 5,680,552 | 10/1997 | Netravali et al. ................ 395/200.2 |

FOREIGN PATENT DOCUMENTS

| | | |
|---|---|---|
| 97 23078 | 6/1997 | (WO) . |
| 97 47118 | 12/1997 | (WO) . |

OTHER PUBLICATIONS

"A Packet Telephony Gateway for Public Network Operators", Houghton TF et al. ; Iss '97 World Telecommunications Congress, Global Network Evolution: Convergence or Collision? Toronto, Sep. 21–26, 1997, vol. 2, pp. 35–44.

"Real–Time Voice Over Packet–Switched Networks";Kostas TJ et al.;, IEEE Network: The Magazine of Computer Communications, vol. 12, No. 1, , Jan. 1, 1998, pp. 18–27.

*Primary Examiner*—Melvin Marcelo

(57) ABSTRACT

A gateway (1000a) is provided including a telephony interface (1004), a network interface (1002), and a digital signal processor (DSP) (1008a) for encoding the incoming telephony channels. The telephony interface (1004) is configured to separate an incoming data stream into separate channels. The telephony interface (1004) is further configured to control operation of a plurality of clocks for synchronizing the transfer of the channels to the encoding DSP, thereby minimizing multiplexing delay. According to another embodiment, the incoming channels are separately initialized by a controller 1050, at a predetermined delay.

19 Claims, 5 Drawing Sheets

B-CHANNEL SYNCHRONIZATION FOR G 723 1 VOCODING

BACKGROUND OF THE INVENTION

1. Field of the Invention

The present invention relates to computer telephony and, in particular, to a Voice over IP (VoIP) application.

2. Description of the Related Art

The use of the Internet for real-time voice applications is increasingly widespread. A key to real-time speech and voice transmission on the Internet is the Voice over IP (VoIP) gateway. The Voice over IP gateway bridges the public switched telephone network (PSTN) or integrated services digital network (ISDN) with the packet-switched data network (TCP/IP Local Area Network). Such a VoIP gateway is configured to provide IP call control and IP data transport, which includes compression/decompression of voice channels using G.723.1 vocoding. In addition, PSTN or ISDN call control and compression and packetization are provided, typically using G.711 vocoding.

An exemplary gateway system 1000 is illustrated in FIG. 1. The gateway system 1000 includes an IP Network Interface 1002, a host computer 1006, a voice payload data processing unit 1008, and a PBX interface 1004. The IP Network Interface 1002 is coupled, for example, to a 10 MBit Ethernet. The PBX Interface 1004 is coupled, for example, to a plurality of E1/TI/PRI lines. The host computer 1006 includes a conversion unit 1006a and a fax processing unit 1006b, and provides overall system control.

Voice payload processing is accomplished at the Voice Payload Data Processing Unit 1008. The voice payload data processing unit 1008 may include a plurality of digital signal processors (DSP). Typically, one DSP handles the call processing (e.g., real-time vocoding, silence suppression, echo cancellation, DTMF filtering, and $\mu$-law/a-law conversion) of three or four channels. The IP Network Interface 1002 performs IP Network packetizing for received voice payload data packets from the voice payload data packet unit 1008. This includes, for example, encapsulating the data using RTP, UTP, IP and Ethernet headers. The gateway system 1000 may support both voice and fax operations.

A key to successful VoIP gateway functionality is the minimization of encoding/decoding delays at the DSPs. Delay causes two problems; echo and talker overlap. Delay may result from the need to collect a frame of voice samples to be processed by the voice coder, the process of encoding and collecting the encoded samples into a packet for transmission over the packet network, or network delays which are caused by the physical medium and protocol used to transmit the voice data and by the buffers used to remove packet jitter on the received side. As discussed above, in a typical VoIP gateway, a three or four telephony channels are compressed/decompressed by a single DSP which then provides the data to the IP Network Interface. FIG. 2 illustrates a single DSP. For sake of clarity, the host computer 1006 and additional DSPs are omitted. Gateway 100 includes a digital signal processor (DSP) 102, a network interface 104, as well as a telephone interface 106. As shown, a G.723.1 encoding/decoding module 108 is provided for converting the received pulse code modulation (PCM) signals into signals suitable for IP transmission. The telephony interface 106 interfaces with the telephone network. As shown, three 64 kilobit per second telephony channels 110, 112 and 114 are fed into the DSP 102. The channels 110, 112 and 114 are not synchronized. Accordingly, multiplexing delays at the DSP 102 may be introduced which can have a detrimental effect upon system performance. The multiplexing delay can be anywhere between zero milliseconds and thirty milliseconds, minus processing time for encoding/decoding.

The multiplexing delays are illustrated in greater detail in FIG. 2. In particular, the telephony interface 106 separates the received ISDN data stream into three (for example) B-channels, designated channel A, channel B, and channel C, respectively. (Typically, the telephony data is provided as a constant stream, which is buffered, processed, buffered, and sent out). As shown, voice channels A, B and C are received approximately simultaneously according to a single clock. Thus, one 30-millisecond frame may be ready for encoding for each incoming telephony channel at the same time, designated $T_0$. Since the channels are being received simultaneously, a packet for each channel A, B, and C is also available (simultaneously) at times $T_1$-$T_4$. As can be seen, the G.723.1 encoding of channel A, represented by reference $A_1$, is completed at time $T_1+\Delta T$. The encoding of channel B, represented by reference $B_1$, is not completed until $T_1+2\Delta T$; and the encoding of channel C, represented by reference $C_1$, is not completed until $T_1+3\Delta T$. A similar result is obtained for the encoding of subsequent voice packets. As can be seen, there may be a large multiplexing delay on channel C. As shown, a delay of $3\Delta T$ is required before channel C is encoded.

Accordingly, there is a need for an improved voice-over IP gateway which minimizes system delays. In particular, there is a need for a VoIP gateway which minimizes multiplexing delays at the DSP.

SUMMARY OF THE INVENTION

These and other problems in the prior art are overcome in large part by a VoIP gateway according to the present invention. According to an embodiment of the present invention, incoming telephony channels are synchronized prior to transmission to the vocoder to minimize multiplexing delays. In particular, in one embodiment employing three 64 kilobit per second telephony channels with 30 millisecond frames, a 10 millisecond delay is introduced between each channel. In this fashion, system delays may be minimized. For example, the channels may be separately initialized at 10 millisecond intervals.

According to one embodiment of the invention, a gateway is provided including a telephony interface, a network interface, and a digital signal processor (DSP) for encoding the incoming telephony channels. The telephony interface is configured to separate an incoming data stream into separate channels. The telephony interface is further configured to control operation of a plurality of clocks for synchronizing the transfer of the channels to the encoding DSP.

BRIEF DESCRIPTION OF THE DRAWINGS

A better understanding of the present invention can be obtained when the following detailed description is considered in conjunction with the following drawings in which.

DETAILED DESCRIPTION OF THE INVENTION

Figure 2:
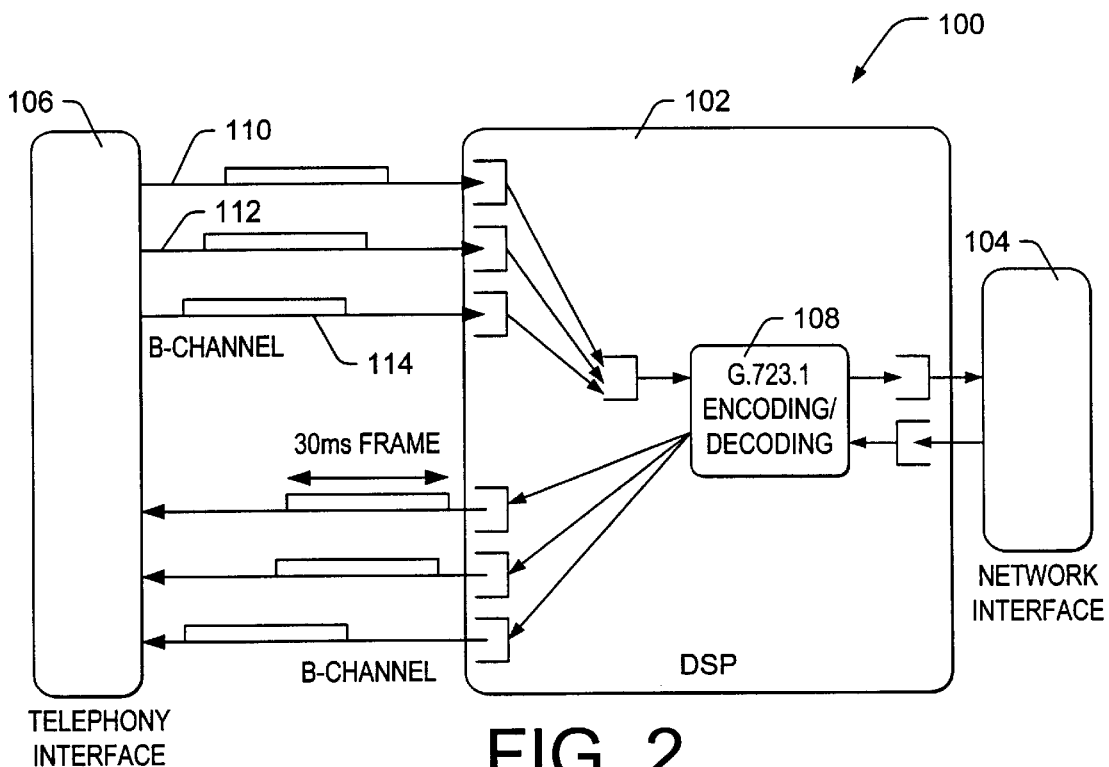
FIG. 2 is a block diagram of a VoIP gateway.
Figure 3:
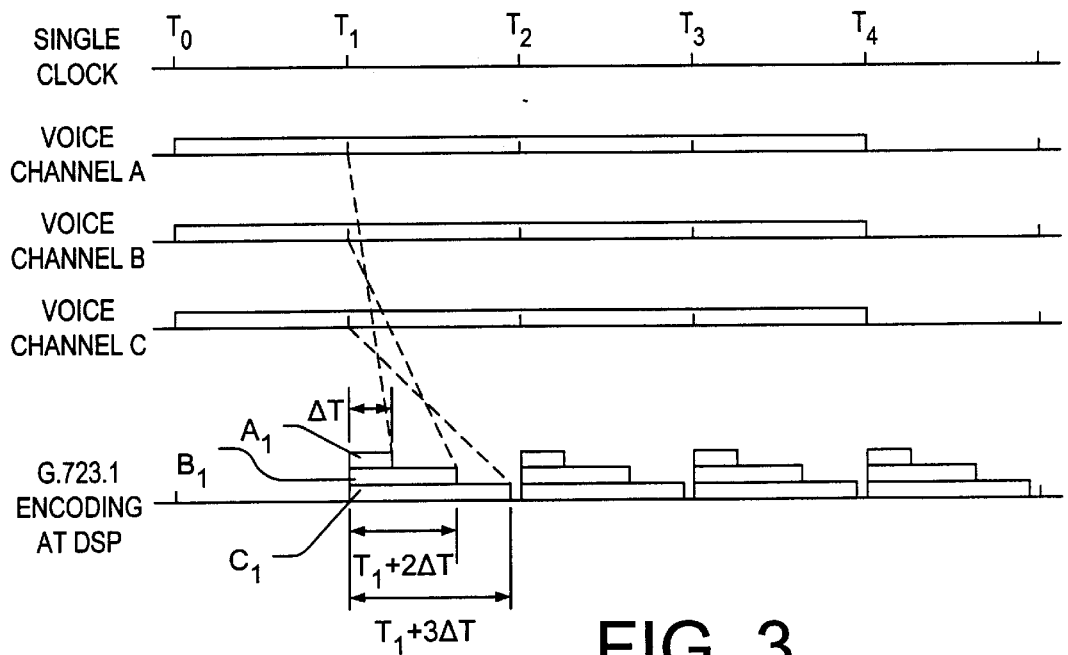
FIG. 3 is a diagram illustrating unsynchronized multiplexing in a VoIP gateway according to the prior art.
Figure 4:
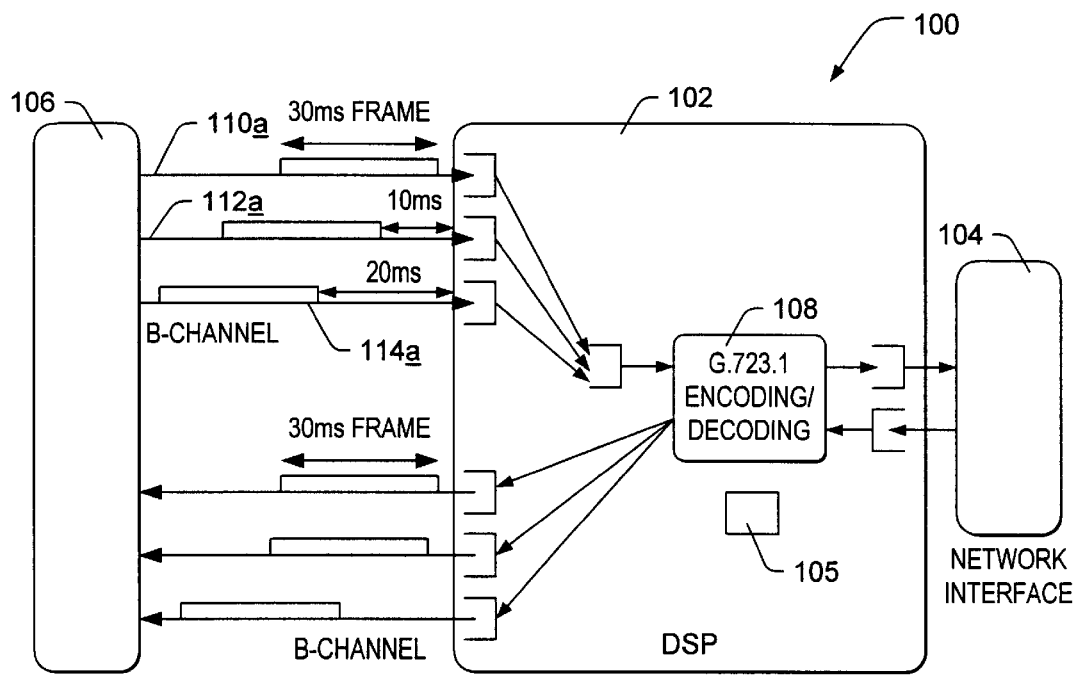
FIG. 4 is a block diagram of a VoIP gateway according to an embodiment of the present invention.

Turning now to the drawings, and with particular attention to FIG. 4, a schematic diagram showing operation of an embodiment of the present invention is illustrated, generally similar to FIG. 2. For ease of reference, reference numerals which correspond to like components retain the same reference numerals. As shown, the VoIP gateway 100 receives the incoming B-channels 110a, 112a, 114a in a time-synchronized fashion. In particular, as illustrated, each 30 millisecond frame for each B-channel 110a, 112a, 114a is received at a synchronization of 10 milliseconds apart, as will be described in greater detail below. This guarantees a low multiplexing delay received at the encoder/decoder 108. It is noted that both the incoming and outgoing B-channels may be synchronized. However, in the case of G.723.1 vocoding, considerably more processing power is needed for the encoding rather than the decoding. Accordingly, multiplexing delay is significantly reduced if only the incoming B-channels are synchronized.

Figure 5:
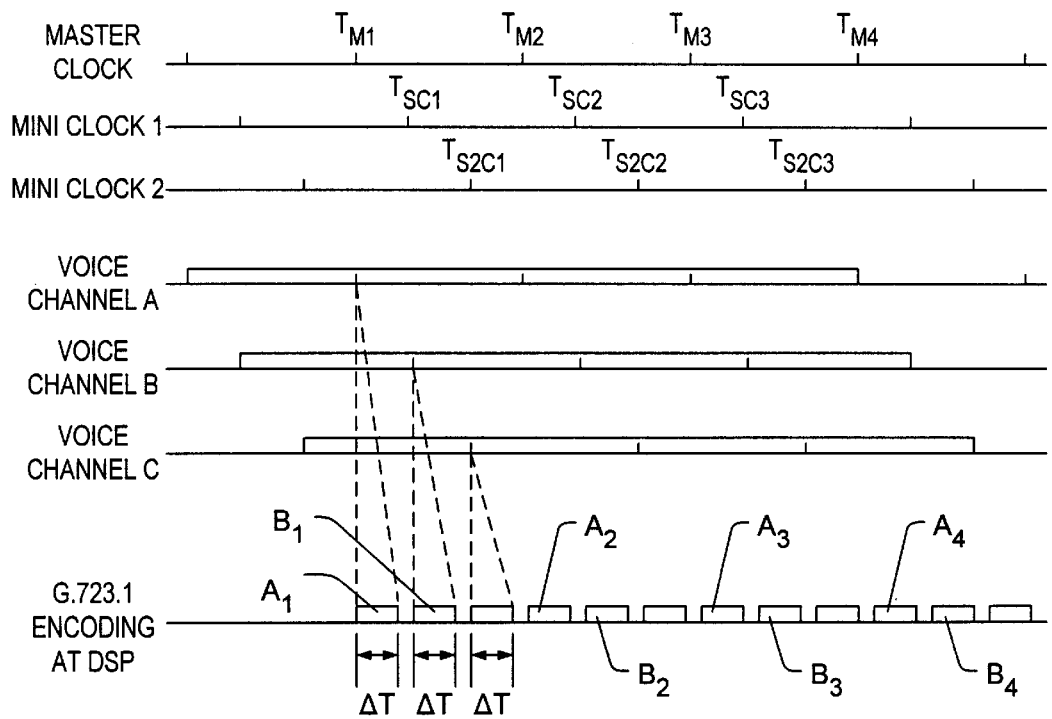
FIG. 5 is a diagram illustrating synchronized multiplexing according to an embodiment of the present invention.

FIG. 5 illustrates a timing diagram of synchronization of incoming B-channels A, B and C and their respective clocking signals. In particular, a master clock and two slave clocks, clock 1 and clock 2, are provided. The master clock may be, for example, the system clock. The slave clock 1 and slave clock 2 are clocked off the master clock at a delay, for example, of 10 milliseconds. The voice channels A, B and C are received into the vocoding DSP 102 in synchronization with each of the clocks. For example, the voice channel A is received in synchronization with the master clock. Voice channel B is received in synchronization with the slave clock 1, and voice channel C is received in synchronization with the slave clock 2. The G.723.1 encoding occurs in synchronization with the master and slave clocks. In particular, at time $T_{M1}$, voice channel A is encoded, as denoted by reference $A_1$. At time $T_{S1C1}$, voice channel B is encoded as denoted by reference $B_1$; and at time $T_{S2C2}$, voice channel C is encoded as denoted by reference $C_1$. The next time the master clock clocks at time $T_{M2}$, voice channel A is again encoded as referenced by reference $A_2$. At $T_{SC2}$, voice channel B is encoded at time $T_{S2C2}$, voice channel C is encoded, and so on. In this manner, the multiplexing delay for voice channel C is effectively reduced. In particular, as seen in FIG. 4, encoding of the first packet of channel A is completed at $T_{M1}+\Delta T$, or a time $\Delta T$ after the packet is received. Encoding of the first packet of channel B is completed at time $T_{S2C1}+\Delta T$, again at a time $\Delta T$ after the packet is received. Similarly, encoding of the first packet of channel C is completed at time $T_{S2C1}+\Delta T$, again a time $\Delta T$ after the packet is received. As can be seen, the delay is reduced from $3\Delta T$ to $\Delta T$, virtually eliminating the multiplexing delay.

Figure 1:
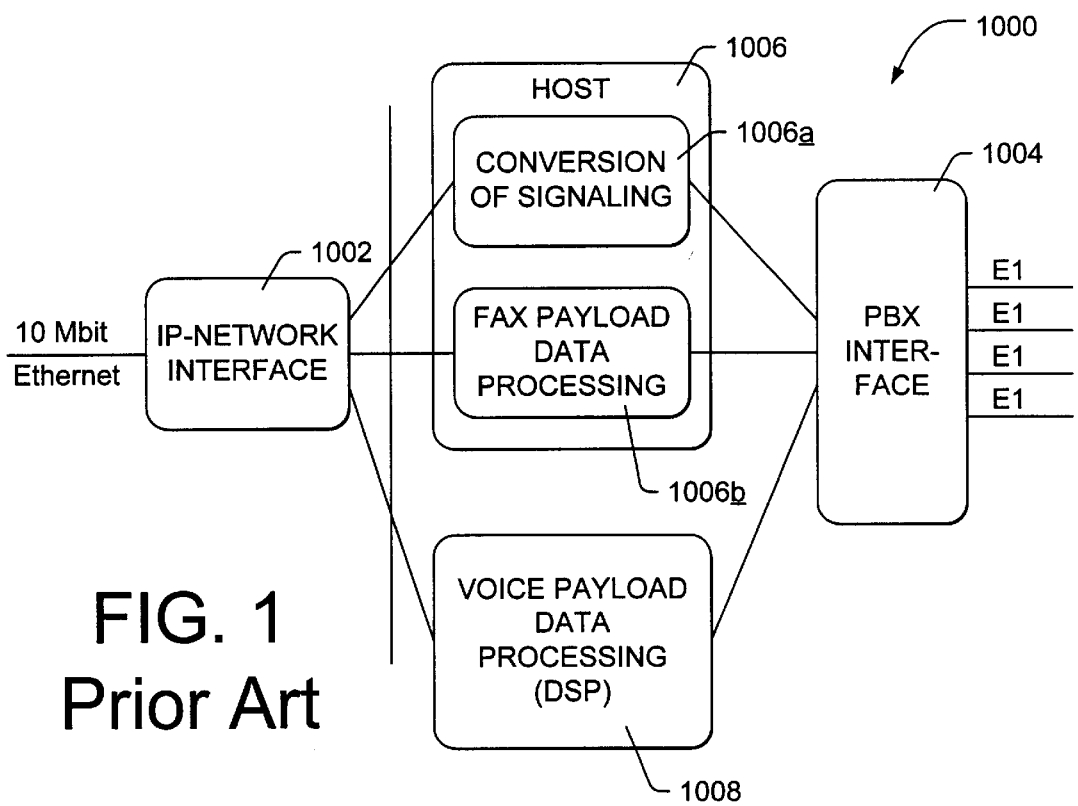
FIG. 1 is a diagram of a gateway system.
Figure 6:
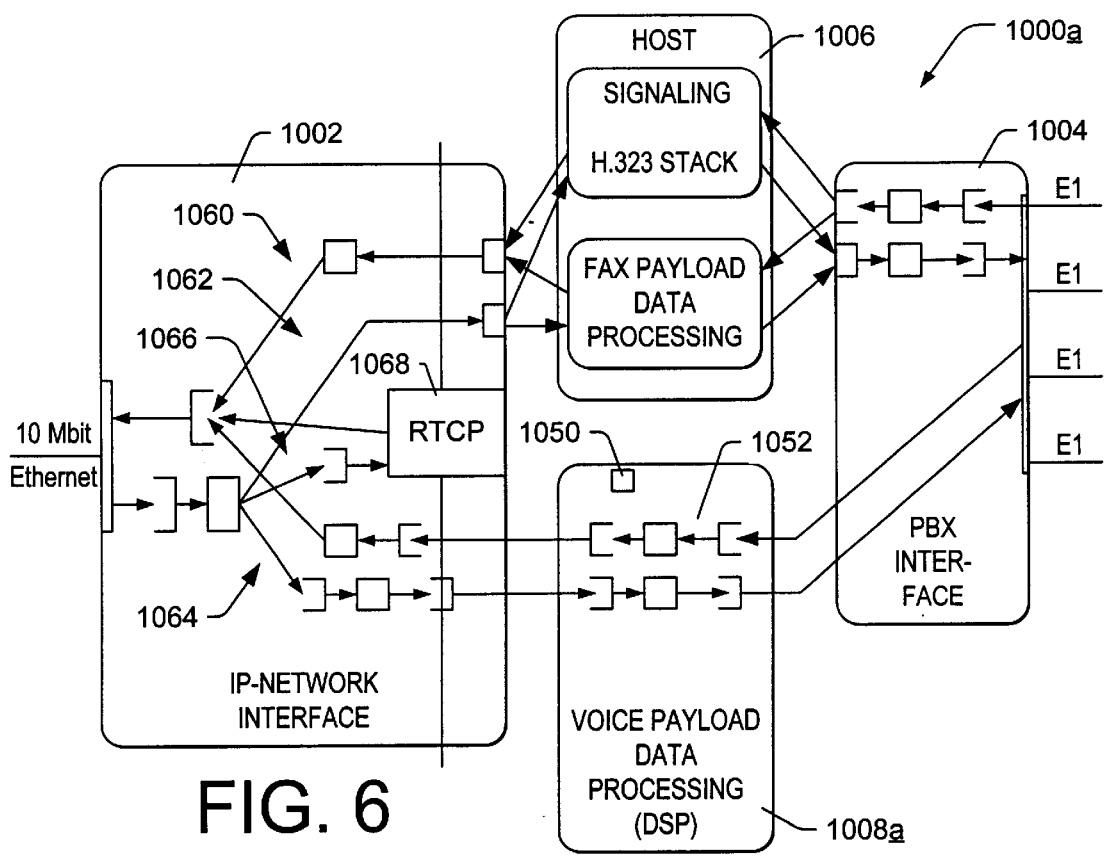
FIG. 6 is a diagram of a gateway system according to the present invention.

Turning now to FIG. 6, a block diagram illustrating a gateway system according to an embodiment of the present invention is shown. For sake of clarity, common components retain the same reference numerals. The gateway interface 1000a thus includes an IP Network Interface 1002, a PBX Interface 1004, a host computer 1006 and a voice payload data processing unit 1008a. The voice payload data processing unit 1008a includes a control unit 1050. As will be discussed in greater detail below, the control 1050 may be configured to control the initialization of the individual DSP cards of the voice payload data processing unit 1008a, as well as initializing the individual receive channels from the PBX interface 1004.

Briefly, the PBX interface 1004 includes a plurality of E1 inputs which typically provide, for example, fax data to and from the host 1006 and voice data to and from the voice payload data processing DSP 1008a. The voice payload data processing unit 1008a includes an input route 1052 which includes, for example, input and output buffers and processing blocks. As is well know, the processing blocks are configured to provide, for example μ-law and a-law encoding. The IP Network Interface 1002 similarly includes a 10 megabit Ethernet link and input and output paths to the voice payload data processing unit 1008a and the host 1006. In particular, the IP Network Interface 1002 includes a receive path 1060 from the host computer for handling fax data and a path 1062 to the host computer for transferring fax data to the host computer 1006. In addition, voice paths 1064 and 1066 are provided. Finally, an RTCP unit 1068 is provided.

According to the present invention, the voice payload data processing unit 1008a may include a plurality of digital signal processors and digital signal processing cards. Each digital signal processor is configured to process signals received from predetermined telephony channels. When the data are received from a particular channel, the particular DSP is initialized, for example, by the control unit 1050. Initialization may include, for example, activation of power controllers and clocking. As mentioned above, each DSP may support a plurality of channels. Each channel is separately initialized. For example, when the individual DSP 102 (FIG. 4) begins to receive data on the incoming channels the controller 1050 will initialize a first channel, for example, channel A, wait a predetermined delay, for example, 10 milliseconds, and initialize a next channel, for example, channel B, and wait another predetermined delay, for example, 10 milliseconds, before initializing the third channel, for example, channel C. By delaying the initialization of each channel, the controller 1050 delays the arrival of the incoming data channel stream. Thus, the DSP 102 receives the channels in synchronization, thereby reducing the multiplexing delay.

Figure 7:
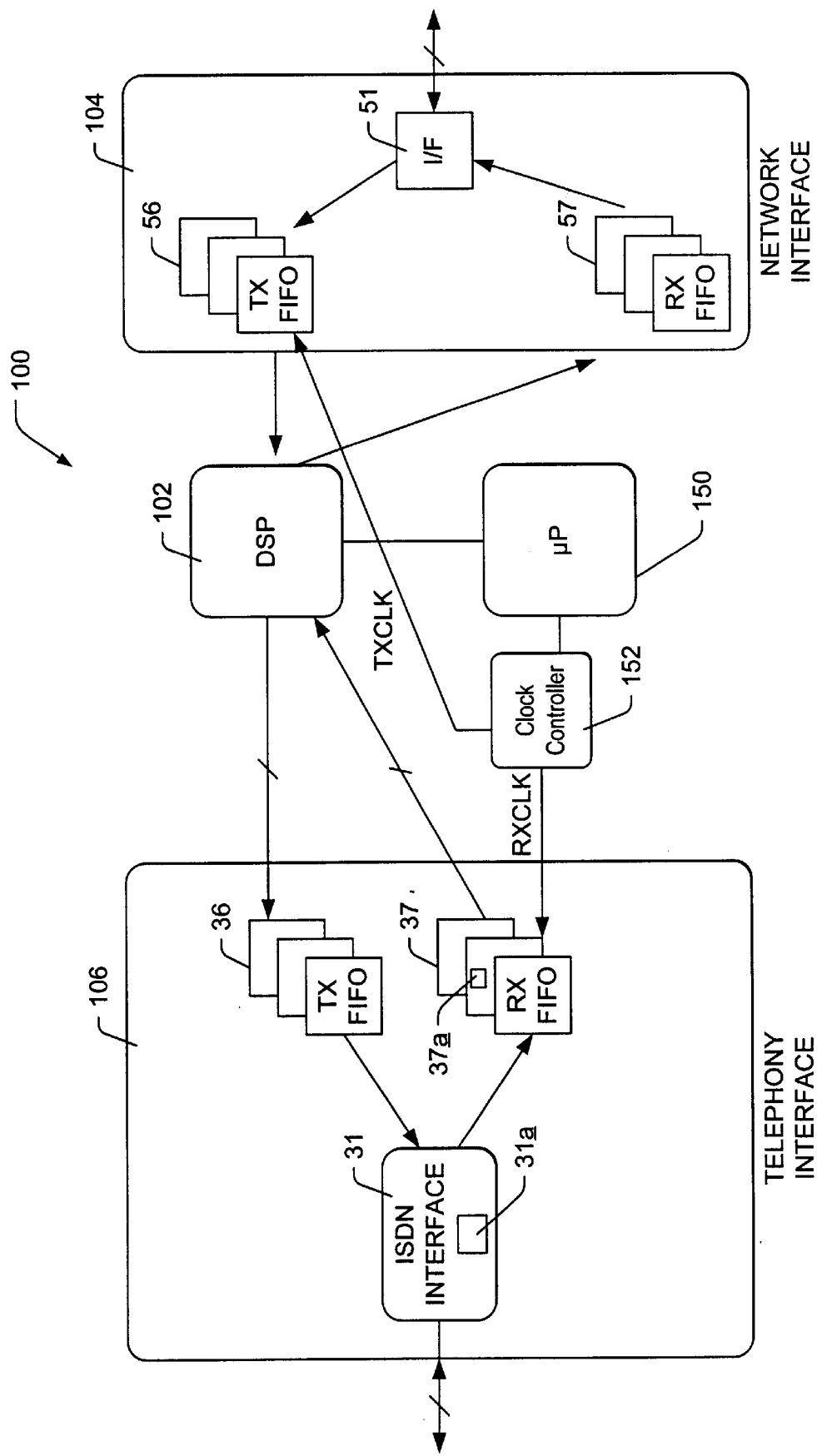
FIG. 7 is a more detailed diagram of the VoIP gateway of FIG. 4.

Turning now to FIG. 7, a block diagram illustrating in more detail a gateway 100 according to an alternate embodiment of the present invention is illustrated. As in FIG. 4, the gateway 100 includes a telephony interface 106, a DSP 102 and a network interface 104. The DSP 102 may be a commonly available DSP such as a TMS 320C5X available from Texas Instruments, Inc. In addition, a microprocessor 150 is coupled to control a clock controller 152. As shown, the clock controller 152 provides a master clock RXCLK to the telephony interface 106 for clocking the coding and decoding of the ISDN B-channels.

The signal to be transmitted coming from the ISDN line is provided to the ISDN interface circuit 31. The ISDN interface circuit 31 is a standard ISDN interface circuit, and includes a channel identification unit 31a. For example, the ISDN interface circuit 31 may be any commonly available ISDN interface circuit. The channel identification unit 31a is configured to read the incoming data stream and determine which channels are being received. The ISDN interface circuit 31 extracts the various B-channels and the D-channel and passes the data to the first-in, first-out (FIFO) buffer 37. It is noted that the FIFO 37 may include a plurality of FIFO buffers, e.g., one for each incoming channel. The FIFO buffers 37 may be individually clocked by the clock delay unit 37a, which receives the master clock RXCLK from the clock controller 152. The FIFOs 37 are configured to have a throughput of no more than 30 ms, or the frame length. The channel identification unit 31*a* provides a signal to the FIFO 37, which in turn provides the signal to the clock delay unit 37*a,* indicating that more than one channel is being sent. The FIFO 37 routes the incoming channels to the individual buffers. If more than one channel is being received, the buffers storing the extra channels are then separately clocked by the clock delay unit 37*a*. The received data is then fed to the DSP 102 according to the RXCLK and delay clocks. The received data which is provided to the DSP 102 is then converted into G.723.1 format. The ISDN Interface 31 and the FIFO 37 thus perform the function of taking the ISDN signal from a device, extracting the B and D channels and clocks and providing the B-channels to the DSP 102. The FIFO 37 provides a buffer between the ISDN interface 31 and the DSP 102.

Figure 8:
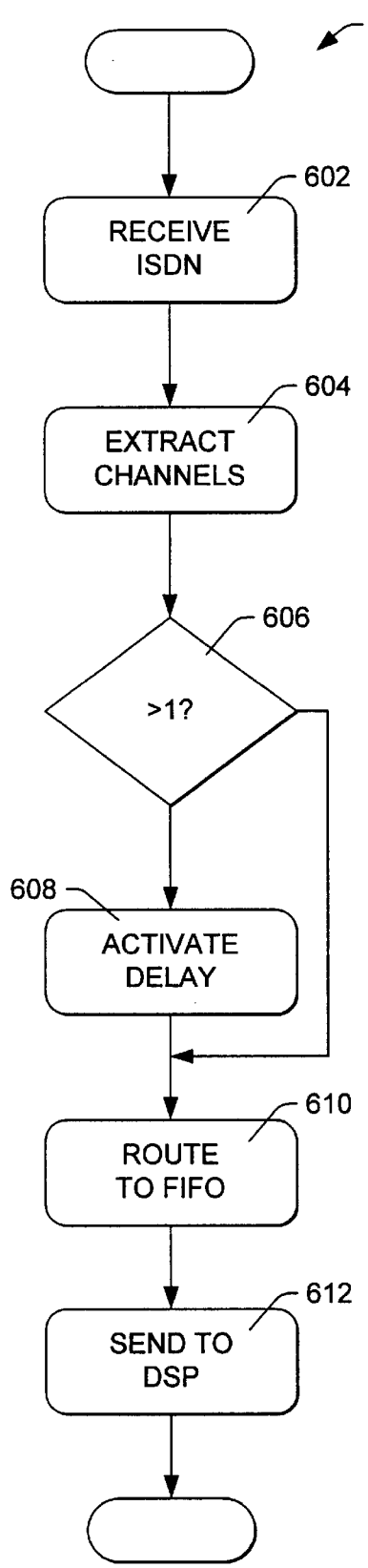
FIG. 8 is a flowchart illustrating operation of an embodiment of the present invention.
Figure 9:
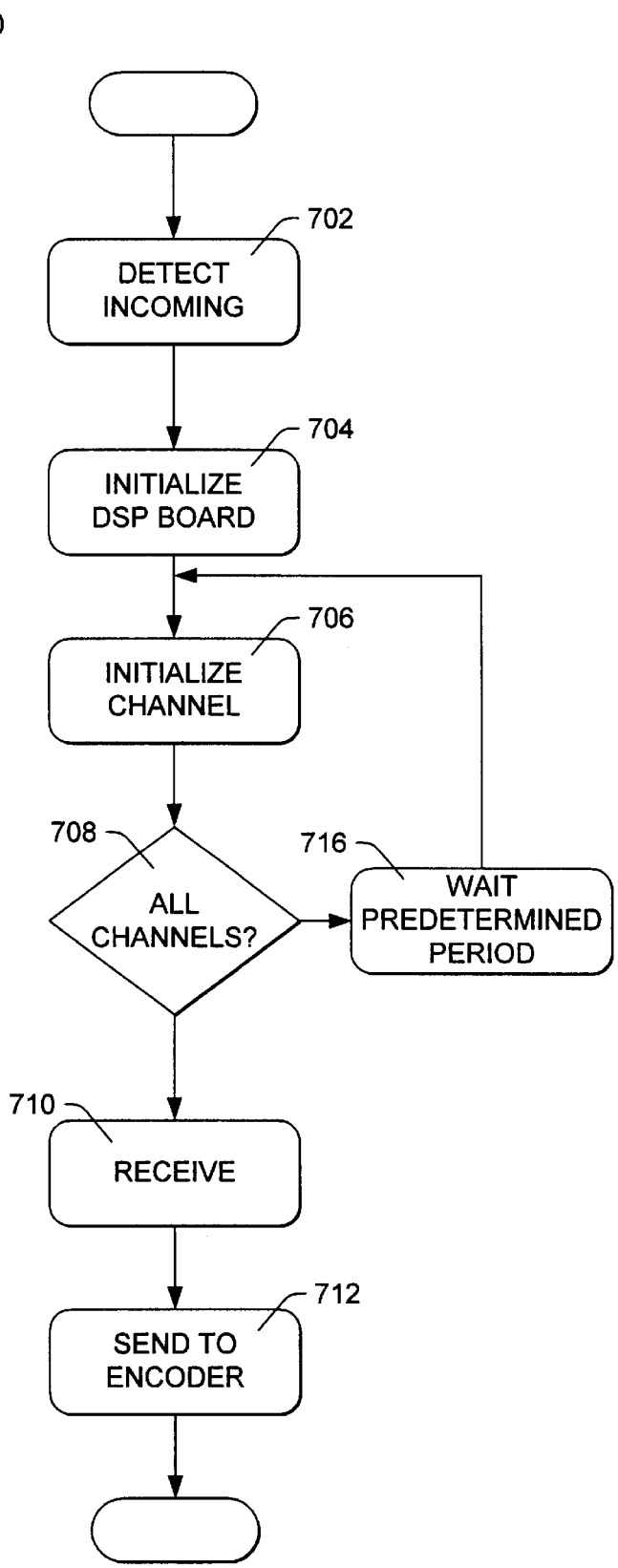
FIG. 9 is a flowchart illustrating operation of an alternate embodiment of the present invention.

Turning now to FIG. 8, a flowchart 600 illustrating operation of the embodiment of the present invention of FIG. 7 is shown. In particular, in a step 602, the gateway 100 receives ISDN data from the ISDN bus. The ISDN data is provided to the ISDN interface circuit 31 of the telephony interface 106. In a step 604, the ISDN interface circuit 31 extracts the various B-channels. In a step 606, the channel identification unit 31*a* provides a signal indicative of whether more than one channel is being received. If so, then in a step 608, the FIFO 37's clock delay 37*a* activates the delays for the corresponding FIFO buffers. In a step 610, the ISDN channels are routed to the corresponding FIFO buffers of the FIFO 37. Finally, in a step 612, the data are sent from the FIFO 37 to the DSP 102.

Turning now to FIG. 8, a flowchart illustrating a method according to the embodiment of FIG. 4 and FIG. 6 is shown. In particular, in a step 702 the system detects the incoming voice stream. In a step 704, the system initializes the DSP system 1008*a,* and in particular, the individual DSP 102. In a step 706, the controller 1050 of the particular DSP 102 initializes a first channel for reception of the incoming data stream. If all channels have been initialized as determined in a step 708, then in a step 710 the streams are received into the channel and in a step 712 are sent to encoding. However, in step 708 if not all channels have been initialized, then the controller will wait a predetermined period, for example, 10 milliseconds in a step 716, prior to initializing the next channel. This will continue until all of the channels have been initialized. Thus, each channel is initialized at a predetermined delay. This allows for the virtual elimination of multiplexing delays.

The invention described in the above detailed description is not intended to be limited to the specific form set forth herein but, on the contrary, is intended to cover such alternatives, modifications and equivalents as reasonably can be included within the spirit and the scope of the appended claims. In particular, it is noted that while described in the context of three channels and ISDN and G.723.1 encoding, it may also apply to the multiplexing of any number of channels by DSPs, and to other types of encoding, such as GSM and G.729/729a.

What is claimed is:

1. A telecommunications gateway, comprising:
   a telephony interface configured to transmit and receive telephony data on a plurality of channels;
   one or more encoders configured to encode said telephony data into network data;
   a network interface configured to transmit and receive said network data to said network; and
   means for synchronizing said plurality of telephony channels to be received by said one or more encoders at predetermined time intervals.

2. A telecommunications gateway according to claim 1, said one or more encoders including one or more digital signal processors configured to receive said telephony data from said plurality of telephony channels in a channel multiplexed fashion.

3. A telecommunications gateway according to claim 2, said synchronizing means configured to synchronize a multiplexing of said plurality of telephony channels.

4. A telecommunications gateway according to claim 3, wherein said telephony channels are ISDN B-channels.

5. A telecommunications gateway according to claim 3, wherein said synchronizing means includes means for clocking each of said plurality of telephony channels.

6. A telecommunications gateway according to claim 1, wherein said synchronizing means includes means for separately initializing each of said plurality of telephony channels.

7. A telecommunications gateway according to claim 6, wherein said initializing means is configured to initialize one or more of said plurality of telephony channels at a predetermined delay from one another.

8. A method for operating a telecommunications gateway, comprising:
   receiving telephony data on a plurality of channels;
   synchronizing said plurality of telephony channels to be received by one or more encoders at predetermined time intervals;
   encoding said telephony data into network data; and
   transmitting said network data to said network.

9. A method according to claim 8, including receiving said telephony data from said plurality of telephony channels in a channel multiplexed fashion.

10. A method according to claim 9, said synchronizing including synchronizing a multiplexing of said plurality of telephony channels.

11. A method according to claim 10, wherein said telephony channels are ISDN B-channels.

12. A method according to claim 10, wherein said synchronizing includes clocking each of said plurality of telephony channels.

13. A method according to claim 8, wherein said synchronizing includes separately initializing each of said plurality of telephony channels.

14. A method according to claim 13, wherein said initializing includes initializing one or more of said plurality of telephony channels at a predetermined delay from one another.

15. A telecommunications gateway, comprising:
   means for transmitting and receiving telephony data on a plurality of channels;
   means for encoding said telephony data into network data; and
   means for synchronizing said plurality of channels to be received by said encoding means at predetermined time intervals.

16. A telecommunications gateway according to claim 15, said synchronizing means configured to synchronize a multiplexing of said plurality of telephony channels.

17. A telecommunications gateway according to claim 16, wherein said synchronizing means includes means for clocking each of said plurality of telephony channels.

18. A telecommunications gateway according to claim 15, said synchronizing means including means for initializing separately one or more of said plurality of telephony channels.

19. A telecommunications gateway according to claim 18, said initializing means configured to initialize one or more of said plurality of telephony channels at a predetermined delay from one another.

* * * * *